United States Patent [19]

Kervagoret

[11] Patent Number: 5,191,827
[45] Date of Patent: Mar. 9, 1993

[54] ELECTRICALLY CONTROLLED PRESSURE-REGULATING SYSTEM FOR A HYDRAULIC CIRCUIT

[75] Inventor: Gilbert Kervagoret, Argenteuil, France

[73] Assignee: Bendix Europe Services Techniques, Drancy, France

[21] Appl. No.: 837,576

[22] Filed: Feb. 18, 1992

Related U.S. Application Data

[62] Division of Ser. No. 674,472, Mar. 25, 1991, abandoned.

[30] Foreign Application Priority Data

Apr. 12, 1990 [FR] France .................. 90 04701

[51] Int. Cl.⁵ ........................................ F15B 13/044
[52] U.S. Cl. ............................. 91/433; 91/459;
137/596.17; 137/625.65; 303/119.2
[58] Field of Search .................. 91/31, 433, 459;
137/596.17, 625.65; 303/119 SV

[56] References Cited

U.S. PATENT DOCUMENTS

| | | | |
|---|---|---|---|
| 3,880,476 | 4/1975 | Belart et al. | 303/119 SV |
| 3,995,652 | 12/1976 | Belart et al. | 137/625.65 X |
| 4,478,250 | 10/1984 | Lukasczyk et al. | 137/625.65 |
| 4,643,225 | 2/1987 | Imhof | 137/596.17 |
| 4,744,389 | 5/1988 | Ichihashi | 137/625.65 |

FOREIGN PATENT DOCUMENTS

| | | |
|---|---|---|
| 227209 | 7/1987 | European Pat. Off. . |
| 3119445 | 2/1982 | Fed. Rep. of Germany . |
| 2503893 | 4/1982 | France . |
| 211409 | 9/1988 | Japan ............ 137/625.65 |

Primary Examiner—Gerald A. Michalsky
Attorney, Agent, or Firm—Larry J. Palguta; Ken C. Decker

[57] ABSTRACT

The pressure-regulating system for a hydraulic circuit, comprises at least one generator (22) of fluid under pressure, a hydraulic motor (20) and a reservoir (24) of fluid under low pressure. It further includes a solenoid valve controlled by a computer and comprising an electrical coil (1) and a sliding magnetic core (3) controlling a slide (7) sliding in a bore provided in a body (9). The slide (7) defines two chambers (11, 15) arranged on either side of the slide (7) in the bore. The slide (7) comprises a hydraulic cell (26) determining a reaction force opposing the force generated by the coil (1), the cell (26) being connected to one of the chambers (11, 15) as long as the solenoid valve is not energized, while it is connected to the hydraulic motor (20) after energization. An elastic mechanism (13) returns the slide (7) and the core (3) to the rest position.

5 Claims, 2 Drawing Sheets

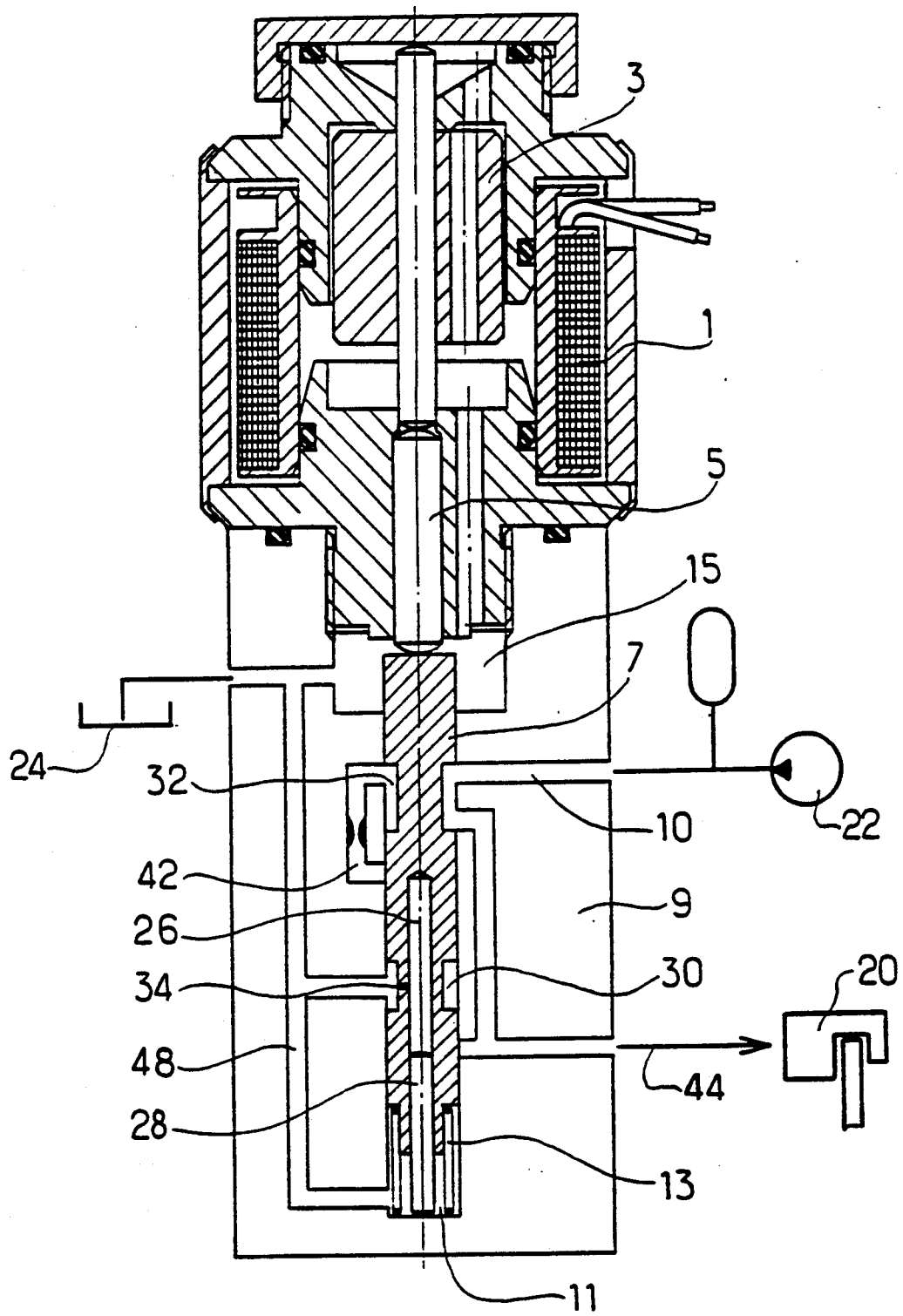
Fig:1

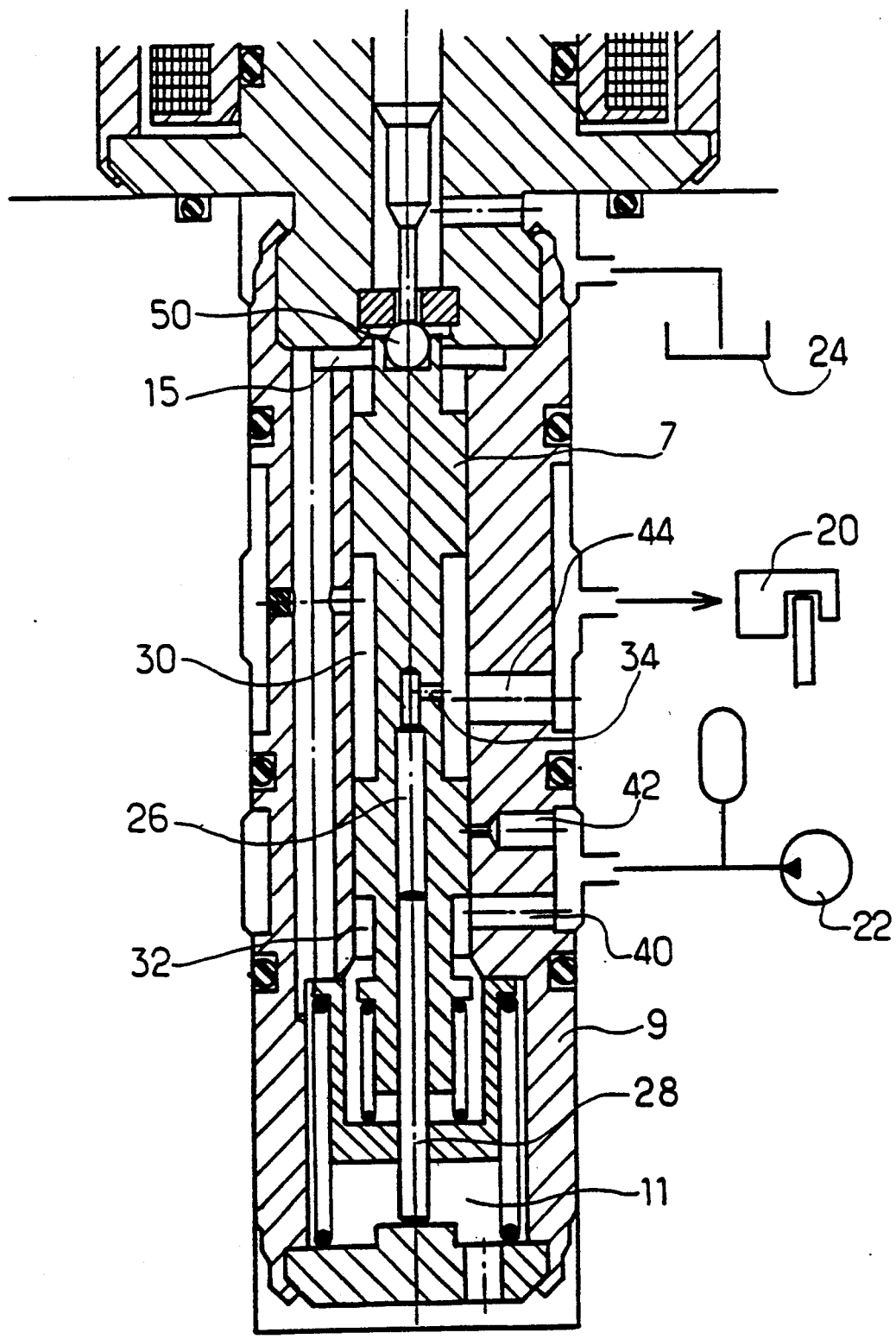
Fig: 2

ELECTRICALLY CONTROLLED PRESSURE-REGULATING SYSTEM FOR A HYDRAULIC CIRCUIT

This is a divisional of abandoned application Ser. No. 07/674,472 filed Mar. 25, 1991, abandoned.

BACKGROUND OF THE INVENTION

The invention relates to an electrically controlled pressure-regulating system for a hydraulic circuit.

It is designed especially for the brake systems of motor vehicles with anti-lock wheel braking. Present anti-lock systems employ, between a generator of fluid under pressure and an hydraulic motor, a solenoid valve controlled by a computer as a function of signals representing the rotation of the wheels of the vehicle, in order, in general terms, to relieve the pressure of the fluid in the hydraulic motor when the computer detects the imminent locking of a wheel and then to connect a second source of fluid under pressure so as to increase the pressure once again, until imminent locking is detected once more, the cycle then being repeated.

The solenoid valve used is a solenoid valve functioning in the all-or-nothing mode. Now the anti-lock periods when cycles, such as the abovementioned cycle, take place last a certain amount of time, during which the solenoid valve changes states very many times within a very short time. This gives rise to an unpleasant hammering noise caused by the moveable part of the solenoid valve.

Moreover, since the system functions in the all-or-nothing mode, pressure surges occur in the brakes, and these generate poorly controlled transient states.

The object of the present invention is to overcome these disadvantages by using a so-called proportional solenoid valve ensuring, in the working circuit, a hydraulic pressure which is a function of the current circulating in the coil of the solenoid valve, within a specific range of movement of the magnetic core of the solenoid valve.

The advantage of such a solenoid valve is, therefore, that it can be controlled simply by varying the current circulating in the coil, without the need for hammering; this thus results in a pronounced reduction of the pressure surges in the brakes. Moreover, such a solenoid valve can easily be controlled by means of a computer ensuring a variable-frequency cutoff of a direct current, such as is found on board a motor vehicle, or a fixed-frequency cutoff with a variable cyclic ratio, the intensity of the current integrated by the coil then being a function of the cyclic ratio.

Such a solenoid valve is described, for example, in U.S. Pat. No. 4,744,389. However, the solenoid valve described in this document cannot be arranged in a hydraulic anti-lock wheel-braking circuit because of the pressures adopted, especially during the energization of the solenoid valve. In fact, the solenoid valve of this document is designed to function permanently in a system for regulating a relatively low pressure. Indeed, the force generated by the return spring used directly opposes the hydraulic reaction force exerted on the slide. This physical limitation therefore precludes the use of such a solenoid valve for high pressures in the hydraulic motor.

SUMMARY OF THE INVENTION

The subject of the present invention is, therefore, a pressure-regulating system for a hydraulic circuit, comprising at least one generator of fluid under pressure, a hydraulic motor and a reservoir of fluid under low pressure and including a solenoid valve controlled by a computer and comprising an electrical coil and a sliding magnetic core controlling a slide which slides in a bore provided in a body, the slide defining two chambers arranged on either side of the slide in the bore.

According to the invention, the slide comprises a hydraulic cell determining a reaction force opposing the force generated by the coil, the cell being connected to one of the chambers as long as the solenoid valve is not energized, while it is connected to the hydraulic motor after energization, an elastic means returning the slide and the core to the rest position.

Preferably, the cell consists of a blind bore made in the slide, while a needle bearing on the body closes the cell substantially sealingly, a radial duct putting it in communication with a groove provided on the periphery of the slide.

BRIEF DESCRIPTION OF THE DRAWINGS

The invention will now be described by way of example with reference to the accompanying drawings in which:

FIG. 1 shows diagrammatically, in section, one embodiment of a system according to the present invention in the rest position, FIG. 2 shows diagrammatically, partially in section, the slide of the solenoid valve according to another embodiment of the present invention.

DETAILED DESCRIPTION OF THE INVENTION

It is known that the coil of so-called proportional solenoid valves has the essential characteristic of being capable of supplying a substantially constant force for a specific current within an appreciable range of movement of the magnetic core of the order of 2 to 3 mm. This characteristic is generally obtained by means of a particular geometry of the pole pieces. This characteristic is utilized in the present invention in order to ensure the requisite function by modulating the current circulating in the coil so as to prevent a functioning in which a moveable part experiences a very rapid hammering.

FIG. 1 shows such a solenoid valve comprising an energizing coil 1, and a sliding magnetic core 3 equipped with its pusher 5 bearing on a slide 7 sliding in a bore of a body 9. The slide 7 is returned to the rest position by a spring 13.

The slide 7 is machined so as to be capable of opening or closing communication between a working hydraulic motor 20, a source of fluid under pressure 22 and a reservoir 24 according to the generally used systems for regulating hydraulic pressure. For this purpose, two grooves 30 and 32 located at a distance from one another are provided on the periphery of the slide 7.

The two chambers 11 and 15 located on either side of the slide 7 in the bore are subjected to the same pressure. A cell 26 consisting of a blind bore made in the slide 7 determines the reaction force opposing the force generated by the coil 1. This cell 26 is closed substantially sealingly by means of a needle 28 bearing on the body 9 of the assembly as a whole and communicates with the grooves 30 by means of a radial duct 34.

In the rest position, as shown, the source of fluid under pressure 22 is in communication with the hydraulic motor 20 by means of the groove 32, while the cell 26 is in communication with the reservoir 24 and the two end chambers 11 and 15. The slide 7 is thus subjected only to the force generated by the spring 13.

When the solenoid valve is energized, for example, during a wheel anti-lock period where the preferred use of the invention is concerned, first of all the current circulating in the coil generates a force opposing only that of the spring 13, whatever the pressure prevailing in the hydraulic circuit. This makes it possible, in particular, for the solenoid valve not to have a high electrical consumption. The subsequent movement of the slide 7 first cuts off any communication between the source 22 and the motor 20, the groove 32 no longer being opposite the conduit 10 for the intake of fluid under pressure, but remaining opposite the conduit 44 for the outlet of fluid towards the hydraulic motor 20. During this time, the cell 26 remains connected to the reservoir 24 by means of the groove 30. The only force opposing the movement of the slide 7 still remains that generated by the spring 13.

The current, increasing in the coil 1, causes an additional movement of the slide 7 counter to this spring 13. This movement first brings the groove 30 opposite the conduit 44 communicating with the hydraulic motor 20, the conduit 48 communicating with the reservoir still remaining opposite the groove 30. This produces a relief of the pressure prevailing in the motor 20 which is thus connected directly to the reservoir 24. The pressure of the fluid in the cell 26 is then negligible since it is substantially equal to that prevailing in the reservoir 24, and the only force still opposing the movement of the slide 7 remains that generated by the spring 13.

A subsequent increase of the current in the coil 1 causes a further movement (downwards in the Figure) of the slide 7 counter to the spring 13. This closes communication between the cell 26 and the reservoir 24, since the conduit 48 for the outlet of fluid towards the reservoir 24 is no longer opposite the groove 30 which is then still opposite the conduit 44 communicating with the hydraulic motor 20. The cell 26 is thus in communication with the motor 20, thereby determining a hydraulic reaction opposing the movement (downwards in the Figure) of the slide 7. It can thus be seen that, by modulating the current circulating in the coil 1, for example, by cutoff, the slide 7 will assume a position which is a function of the pressure prevailing in the cell 26, and by carefully controlling this current the desired fluid pressure can be applied to the motor 20. In fact, the hydraulic reaction generated in the cell 26 will automatically open or close communication between the motor 20 and the source of fluid under pressure 22, for example by way of a restriction 42, and between the motor 20 and the reservoir 24 for each specific value of the intensity of the current circulating in the coil 1.

Of course, instead of the spring 13, a plurality of springs having different stiffnesses can be arranged telescopically, so as to modify accordingly the force opposing that generated by the current in the coil 1.

According to another embodiment, the chambers located on either side of the slide 7 communicate with the source of fluid under pressure 22. In the first operating phases described above, the cell 26 communicates with one of these chambers, so that, at the outset, no hydraulic reaction is generated on the slide 7 as a result of communication with the reservoir 24.

This last characteristic is shown in FIG. 2 where another embodiment has been illustrated partially and diagrammatically. In fact, here, the chambers 11 and 15 communicate with the source 22 by means of the conduit 40. At rest, the cell 26 communicates by way of the duct 34 and the groove 30 with the chamber 11 and therefore with the source 22. According to this embodiment, a normally closed valve 50 located between the chamber 15 and the reservoir 24 makes it possible to isolate the hydraulic circuit under pressure from the reservoir completely when the solenoid valve is not energized. This aspect is especially advantageous when the normal source of fluid under pressure is hydrostatic, such as a master cylinder, because it makes it possible to avoid the problems of pairing and tolerance between the slide 7 and the body 9. When the solenoid valve is energized, the valve 50 opens and the internal leaks are largely compensated by the source 22 which is then dynamic, for example a pump.

As will be seen, the return force is generated, here, by two telescopic springs arranged in the chamber 11. The functioning is similar to that of the embodiment illustrated in FIG. 1. At rest, the source 22 and the motor 20 are in communication. When a current circulates in the coil, the slide 7 moves (downwards in the Figure), first isolating the source 22 from the chamber 11, the cell 26 remaining in communication with the motor 20. Simultaneously, the valve 50 opens, the chambers 11 and 15 then communicating with the reservoir 24. The same applies to the cell 26 and the motor 20. There is therefore a relief of the pressure. By increasing the intensity of the current in the coil, the slide 7 moves further counter to the springs alone, and communication between the reservoir 24 and the cell 26 is cut off since the groove 30 is no longer opposite the conduit for the outlet of the fluid towards the reservoir 24. By further increasing the intensity, the groove 30 then comes opposite the conduit 42 communicating with the source 22, for example by way of a restriction making it possible to slow the subsequent increase in the pressure of the fluid in the motor 20. A hydraulic reaction then occurs because of the cell 26, and by carefully modulating the current circulating in the coil the pressure of the fluid in the motor 20 can be controlled perfectly.

Although only some embodiments of the invention have been described, it is clear that an average person skilled in the art can make many modifications to it, without departing from the scope of the invention as defined by the accompanying claims.

What we claim is:

1. A pressure-regulating system for a hydraulic circuit, comprising at least one generator of fluid under pressure, a hydraulic motor and a reservoir of fluid under low pressure and including a solenoid valve controlled by a computer and comprising an electrical coil and a sliding magnetic core controlling a slide which slides in a bore provided in a body, said slide defining two chambers arranged on either side of the slide in said bore, said slide comprising a hydraulic cell determining a reaction force opposing the force generated by said coil, said cell being connected to one of said chambers as long as the solenoid valve is not energized, elastic means returning said slide and said core to a rest position, wherein said chambers are in connection with said source by means of a conduit when the solenoid valve is not energized, and a normally closed valve being located between one of said chambers and the reservoir so as to isolate the hydraulic circuit under pressure from the reservoir when the solenoid valve is not energized.

2. The pressure-regulating system according to claim 1, wherein said cell comprises a blind bore made in said slide, while a needle bearing on said body closes said cell substantially sealingly, and a radial duct putting the cell in communication with a groove provided on a periphery of said slide.

3. The pressure-regulating system according to claim 1, wherein said elastic means comprises a spring seated in one of said chambers.

4. The pressure-regulating system according to claim 1, wherein said elastic means comprises a set of springs of different stiffnesses arranged telescopically in one of said chambers.

5. The pressure-regulating system according to claim 1, wherein said normally closed valve is opened when the solenoid valve is energized and communicates said chambers with said reservoir.

* * * * *